(12) United States Patent
Mehrvar

(10) Patent No.: US 9,584,885 B2
(45) Date of Patent: Feb. 28, 2017

(54) SYSTEM AND METHOD FOR PHOTONIC SWITCHING

(71) Applicant: Huawei Technologies Co., Ltd., Shenzhen (CN)

(72) Inventor: Hamid Mehrvar, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 319 days.

(21) Appl. No.: 14/246,711

(22) Filed: Apr. 7, 2014

(65) Prior Publication Data

US 2014/0334821 A1 Nov. 13, 2014

Related U.S. Application Data

(60) Provisional application No. 61/822,165, filed on May 10, 2013.

(51) Int. Cl.
*H04Q 11/00* (2006.01)
*H04J 14/02* (2006.01)

(52) U.S. Cl.
CPC ...... *H04Q 11/0066* (2013.01); *H04J 14/0258* (2013.01); *H04J 14/0269* (2013.01);
(Continued)

(58) Field of Classification Search
CPC ........... H04Q 11/0005; H04Q 11/0066; H04Q 2011/0045; H04Q 2011/005;
(Continued)

(56) References Cited

U.S. PATENT DOCUMENTS 5,541,756 A 7/1996 Chang-Hasnain et al.
6,570,873 B1 * 5/2003 Isoyama ............. H04L 12/5693
370/375

(Continued)

FOREIGN PATENT DOCUMENTS

WO 0076256 A1 12/2000
WO 2007056713 A2 5/2007

OTHER PUBLICATIONS

Barker, K. et al., "On Feasibility of Optical Circuit Switching for High Performance Computing Systems," Proceedings of the ACM/IEEE SC 2005 Conference Supercomputing, Nov. 2005, 22 pgs.

(Continued)

*Primary Examiner* — Shi K Li
*Assistant Examiner* — Mina Shalaby
(74) *Attorney, Agent, or Firm* — Slater Matsil, LLP

(57) ABSTRACT

In one embodiment, a method of photonic frame scheduling includes receiving, by a photonic switching fabric from a top of rack (TOR) switch, a frame request requesting a time slot for switching an optical frame to an output port of a photonic switch of the photonic switching fabric and determining whether the output port of the photonic switch is available during the time slot, and generating a contention signal including a grant or a rejection, in accordance with the determining. Also, the method includes assigning the time slot to the TOR switch for the output port of the photonic switch, when the contention signal includes the grant, transmitting, by the photonic switching fabric to the TOR switch, the contention signal and receiving, by the photonic switching fabric from the TOR switch, the optical frame during the time slot, when the contention signal includes the grant.

22 Claims, 11 Drawing Sheets

(52) U.S. Cl.
CPC ... *H04Q 11/0005* (2013.01); *H04Q 2011/005* (2013.01); *H04Q 2011/0033* (2013.01); *H04Q 2011/0039* (2013.01); *H04Q 2011/0045* (2013.01); *H04Q 2011/0064* (2013.01)

(58) Field of Classification Search
CPC ... H04Q 2011/0064; H04Q 2011/0039; H04Q 2011/0033; H04J 14/0258; H04J 14/0269
See application file for complete search history.

(56) References Cited

U.S. PATENT DOCUMENTS

| | | | |
|---|---|---|---|
| 7,006,501 B1 * | 2/2006 | Gura | G06F 13/368 370/395.42 |
| 7,020,161 B1 * | 3/2006 | Eberle | H04L 12/403 370/395.2 |
| 7,120,157 B2 | 10/2006 | Xue et al. | |
| 2001/0004362 A1 * | 6/2001 | Kamiya | H04L 49/30 370/416 |
| 2003/0156597 A1 * | 8/2003 | Eberle | H04L 12/40019 370/447 |
| 2004/0052525 A1 | 3/2004 | Ovadia | |
| 2011/0179208 A1 | 7/2011 | Koka et al. | |
| 2011/0243134 A1 | 10/2011 | Armstrong et al. | |
| 2014/0161450 A1 | 6/2014 | Graves et al. | |
| 2014/0269351 A1 | 9/2014 | Graves et al. | |
| 2014/0334818 A1 | 11/2014 | Mehrvar | |
| 2014/0334819 A1 | 11/2014 | Mehrvar et al. | |

OTHER PUBLICATIONS

Battestilli, T. et al., "An introduction to optical burst switching," Communications Magazine, IEEE, vol. 41, No. 8, Aug. 2003, 6 pgs.

Beheshti, N. et al., "Optical Packet Buffers for Backbone Internet Routers," IEEE/ACM Transactions on Networking, vol. 18, No. 5, Oct. 2010, pp. 1599-1609.

Burmeister, E. F., et al., "A Comparison of Optical Buffering Technologies," Optical Switching and Networking, vol. 5, Issue 1, Mar. 2008, 9 pgs.

Chen, Y. et al., "Optical Burst Switching (OBS): A New Area in Optical Networking Research," IEEE Network Magazine, vol. 18, No. 3, May-Jun. 2004, 13 pgs.

Farrington, N. et al., "Helios: A Hybrid Electrical/Optical Switch Architecture for Modular Data Centers," SIGCOM'10, Aug. 30-Sep. 3, 2010, 12 pgs.

Kachris, C. et al., "A Survey on Optical Interconnects for Data Centers," IEEE Communications Surveys & Tutorials, vol. 14, No. 4, Fourth Quarter (Oct.-Dec.) 2012, 16 pgs.

Kodi, A. K., "Energy-Efficient and Bandwidth-Reconfigurable Photonic Networks for High-Performance Computing (HPC) Systems," IEEE Journal of Selected Topics in Quantum Electronics, vol. 17, No. 2, Mar.-Apr. 2011, pp. 384-395.

Lai, C. P. et al., "Demonstration of Asynchronous Operation of a Multiwavelength Optical Packet-Switched Fabric," IEEE Photonics Technology Letters, vol. 22, No. 16, Aug. 15, 2010, pp. 1223-1225.

Mason, L. et al., "Topological Design and Dimensioning of Agile all Photonic Networks," Computer Networks: The International Journal of Computer and Telecommunications Networking—Optical networks, vol. 50, Issue 2, Feb. 2006, 29 pgs.

Morsy-Osman, M.H. et al., "Performance Evaluation of an Optical Burst Switched Core Node with Generalized Arrivals and Partial Wavelength Conversion Capability," IEEE/OSA Journal of Optical Communications and Networking, vol. 4, No. 12, Dec. 2012, pp. 997-1007.

Pattavina, A., "Architectures and Performance of Optical Packet Switching Nodes for IP Networks," Journal of Lightwave Technology, vol. 23, No. 3, Mar. 2005, 10 pgs.

Singla, A. et al., "Proteus: A Topology Malleable Data Center Network," Hotnets-IX Proceedings of the 9th ACM SIGCOMM Workshop on Hot Topics in Networks, Article No. 8, Oct. 2010, 6 pgs.

Wang, G. et al., "c-Through: Part-time Optics in Data Centers," SIGCOMM'10, Aug. 30-Sep. 3, 2010, pp. 327-338.

Xi, Kang et al., "Petabit Optical Switch for Data Center Networks," Polytechnic Institute of New York University Sep. 2010, 9 pgs.

PCT International Search Report and Written Opinion, International Application No. PCT/CN2014/076943, Applicant: Huawei Technologies Co., Ltd., date of mailing Aug. 8, 2014, 13 pages.

\* cited by examiner

| RTT +p | INPUT # | S1 | S2 | S3 | S4 | S5 | S6 | S7 | S8 | S9 | S10 | S11 | S12 | S13 | S14 |
|---|---|---|---|---|---|---|---|---|---|---|---|---|---|---|---|
| 2T | 1 | 3 ✓ | 5 ✓ | 3 ✗ | 2 ✓ | 2 ✓ | 8 ✗ | 6 ✓ | 4 ✓ | 8 ✓ | 4 ✗ | | | | |
| 1T | 2 | 6 ✓ | 6 ✓ | 5 ✗ | 1 ✗ | 5 ✗ | 3 ✓ | 1 ✗ | 1 ✗ | 8 ✓ | 1 ✓ | | | | |
| 2T | 3 | 2 ✓ | 1 ✓ | 4 ✓ | 1 ✓ | 8 ✗ | 2 ✓ | 1 ✗ | 7 ✗ | 4 ✓ | 2 ✗ | | | | |
| 3T | 4 | 8 ✓ | 3 ✗ | 3 ✗ | 1 ✗ | 3 ✓ | 1 ✗ | 5 ✗ | 7 ✗ | 6 ✗ | 1 ✓ | | | | |
| 4T | 5 | 1 ✓ | 7 ✓ | 8 ✗ | 6 ✓ | 1 ✓ | 7 ✓ | 3 ✓ | 3 ✓ | 7 ✓ | 3 ✓ | | | | |
| 3T | 6 | 1 ✓ | 5 ✓ | 5 ✗ | 5 ✓ | 4 ✓ | 2 ✓ | 7 ✓ | 3 ✓ | 1 ✗ | 5 ✓ | | | | |
| 5T | 7 | 4 ✓ | 1 ✓ | 8 ✗ | 3 ✓ | 5 ✗ | 6 ✓ | 1 ✓ | 2 ✓ | 5 ✓ | 4 ✓ | | | | |
| 4T | 8 | 3 ✓ | 7 ✗ | 6 ✗ | 1 ✓ | 1 ✗ | 1 ✓ | 7 ✗ | 4 ✓ | 6 ✗ | 2 ✓ | | | | |

140

S#: SLOT TIME NUMBER

SYSTEM AND METHOD FOR PHOTONIC SWITCHING

This application claims the benefit of U.S. Provisional Application Ser. No. 61/822,165 filed on May 10, 2013, and entitled "System and Method for Synchronization and Contention Control for Buffer-less Datacenter Photonic Switches," which application is hereby incorporated herein by reference.

TECHNICAL FIELD

The present invention relates to a system and method for optical communications, and, in particular, to a system and method for photonic switching.

BACKGROUND

Growth of internet traffic, fueled by the growth in the number of users and by increasing numbers of applications, results in a higher demand for bandwidth. This growth entails larger packet networks with greater switching capabilities. Data centers contain huge numbers of racks of servers, racks of storage devices, and other racks, all of which are interconnected via a massive centralized packet switching resource. In data centers, electrical packet switches are used to route data packets. Electronic packet switching at very high rates involves massive cooling and space costs. Thus, photonic packet switching is desirable.

The racks of servers, storage, and input-output functions contain top of rack (TOR) switches which combine packet streams from their associated servers and/or other peripherals into a smaller number of high speed streams per TOR switch which are routed to the packet switching core. Also, TOR switches receive the returning switched streams from that resource and distribute them to servers within their rack. There may be 4×40 Gb/s streams from each TOR switch to the packet switching core, and the same number of return streams. There may be one TOR switch per rack, with hundreds to tens of thousands of racks, and hence hundreds to tens of thousands of TOR switches in a data center.

SUMMARY

An embodiment method of photonic frame scheduling includes receiving, by a photonic switching fabric from a first top of rack (TOR) switch, a first frame request requesting a first time slot for switching a first optical frame to a first output port of a photonic switch of the photonic switching fabric and determining whether the first output port of the photonic switch is available during the first time slot. The method also includes generating a first contention signal including a grant or a rejection, in accordance with the determining and assigning the first time slot to the first TOR switch for the first output port of the photonic switch, when the first contention signal includes the grant. Additionally, the method includes transmitting, by the photonic switching fabric to the first TOR switch, the first contention signal and receiving, by the photonic switching fabric from the first TOR switch, the first optical frame during the first time slot, when the first contention signal includes the grant.

An embodiment method of coordinating photonic frames includes determining a round trip time (RTT) for an optical frame from a top of rack (TOR) switch to a photonic switching fabric and back to the TOR switch and transmitting, by the TOR switch to the photonic switching fabric, a first transmission request indicating a first output port of a photonic switch of the photonic switching fabric. The method also includes receiving, by the TOR switch from the photonic switching fabric, a contention response and transmitting, by the TOR switch to the photonic switching fabric, a first frame at a first total time of the RTT plus a processing time after transmitting the first transmission request, when the contention response indicates a grant of the first transmission request.

An embodiment photonic switching fabric includes a first label detector configured to receive a first transmission request from a first top of rack (TOR) switch requesting a first time slot for switching a first optical frame to a first output port of a photonic switch and a switch controller configured to determine whether the first output port of the photonic switch is available during the first time slot, assign the first time slot to the first frame when the first time slot is available, and transmit a first contention signal rejecting or granting the first frame to be transmitted to the first TOR switch during the first time slot. The photonic switching fabric also includes the photonic switch configured to receive the first frame from the first TOR switch during the first time slot when the first contention signal grants the first transmission request.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 4 illustrates an embodiment request table;

FIG. 5 illustrates an embodiment schedule;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In one embodiment, one wavelength is used to signal the grant or rejection of a frame, which may be wrapped in a frame, or not wrapped, to an output destination. The transmission between top-of-rack (TOR) switches and a photonic switching fabric is synchronized for the slot duration. Following contention analysis a switch controller determines a switching map for the time slot. Frames are then synchronously received at the input of the photonic switch from TOR switches with different round trip times (RTTs). The scheduling algorithm is based on a slot based system, in which a switch sends a periodic transmission of a synchronization message over one signaling wavelength per slot, or once every few slots. Since the photonic frames arrive at the switch inputs at the same time with some minimal jitter, a time slot is used as a unit of time.

Figure 1:
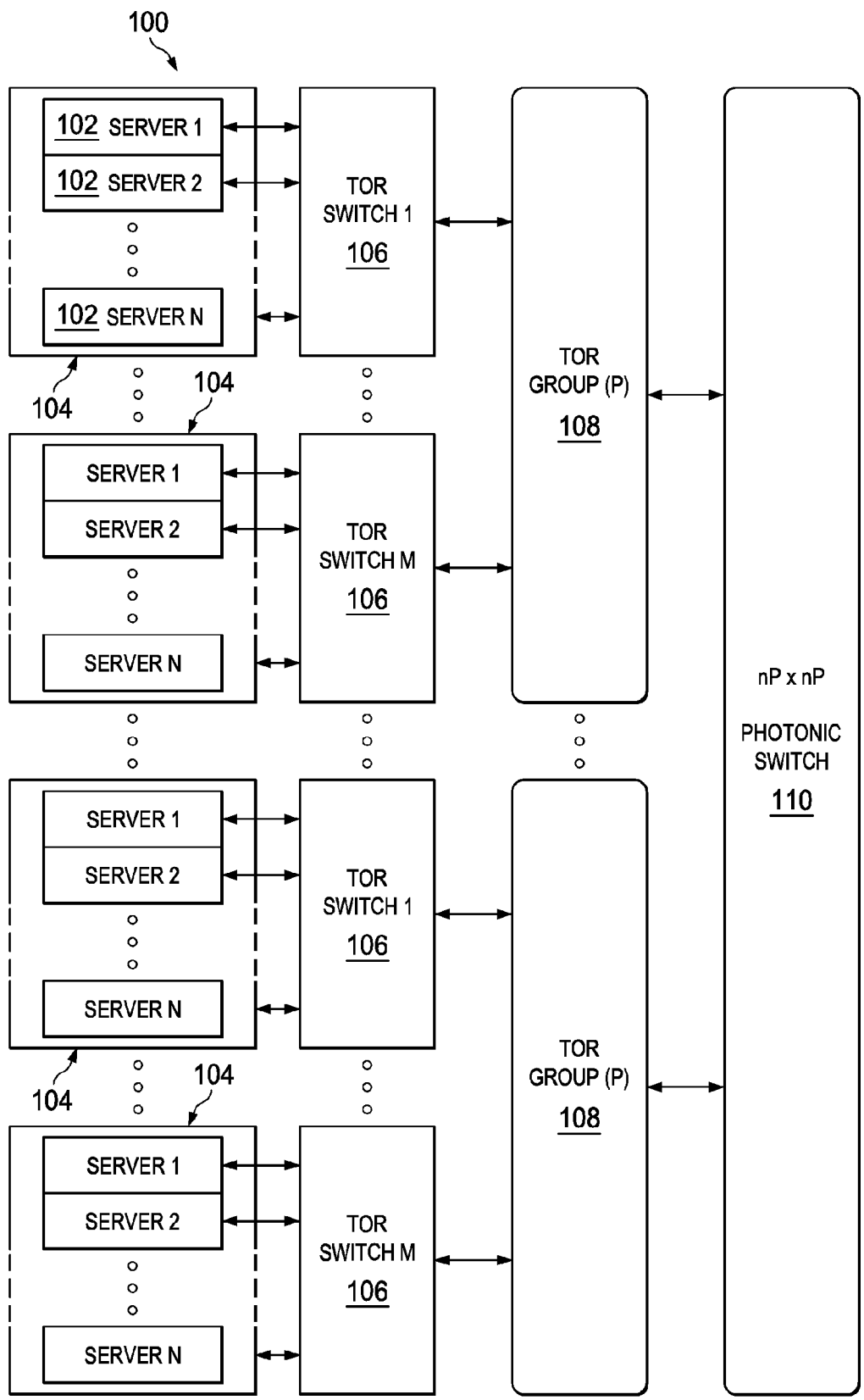
FIG. 1 illustrates an embodiment data center.

FIG. 1 illustrates data center 100, a single hub three tier data center. Server banks 104 contain N servers 102 each. Servers of the server banks are connected to TOR switches 106, the smallest switches. Servers 102 and TOR switches 106 are organized in racks. TOR groups 108, cluster switches, are connected to TOR switches 106. There are M TOR switches per TOR group, and P TOR groups. TOR groups 108 are connected to photonic switch 110, an nP by nP photonic switch, with n parallel interfaces. In one example, N=48, M=32, P=32, and n=1, which has 50,000 servers. Traffic is routed from source servers of servers 102 through TOR switches 106, TOR groups 108 to be switched by photonic switch 110. The traffic then proceeds through TOR groups 108 and TOR switches 106 to destination servers of servers 102.

Figure 2:
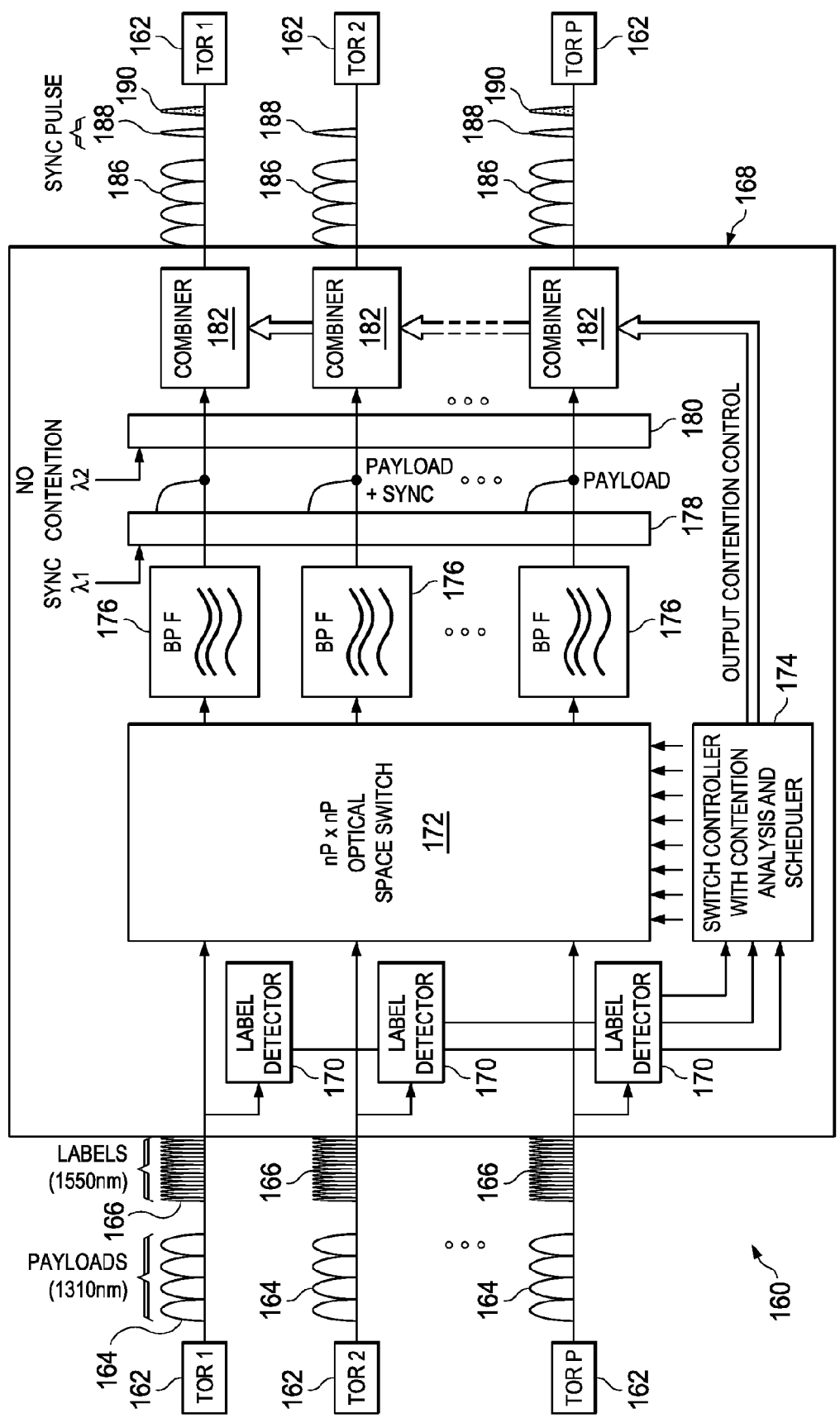
FIG. 2 illustrates an embodiment photonic switching fabric.

FIG. 2 illustrates photonic switching fabric 160 having a bufferless photonic switching architecture. There is a separation of the signaling or control waveband 166 and data or payload waveband 164. For example, the 1310 nm wavelength band is used for the payload data and the 1550 nm wavelength band is used for the control signaling.

A silicon photonic transceiver in the 1550 nm waveband may be used to generate and receive the control signals. Low cost Fabry-Perot lasers may be used as the light source for high speed wavelength division multiplexing (WDM). There may be a pair of integrated transceivers per segment or hop of the network in the TOR groups. The signaling path carries point-to-point information between two points or nodes. At TOR switches 162, a destination address and payload data are encoded and modulated in two separate bands. The labels are modulated on a control wavelength and transmitted to photonic switching fabric 168, which may be integrated in a photonic integrated circuit (PIC). In an example, a laser array is flip-chip bonded onto a silicon photonic chip using an automated pick-and-place machine and passive alignment. Using physical features and alignment marks, the array is soldered in place, precisely aligning the lasers with their corresponding waveguides on the silicon photonic chip. There may be a grating on the waveguides of the silicon chip to convert a broadband laser into a precise WDM laser. The gratings are imprinted simultaneously using a photolithographic mask. The laser gratings are created using a silicon process, so the lasers can be used to generate the required wavelengths.

In photonic switching fabric 168, the label information is decoded by label detectors 170. For example, label detectors 170 may be integrated WDM detectors. The label signals are separated by wavelength. Then, the power of each separated wavelength signal is detected, by the optical signal being converted to an electrical signal. In one example, the power of the separated wavelength signals are converted to a digital binary signal, where a 1 is produced if the power is above a threshold and a 0 is produced when the signal is below the threshold, or vice versa. The digital signal may then indicate the destination address of the corresponding pattern, and hence the corresponding output port of optical switch 172.

The decoded label information is then passed to switch controller 174. In switch controller 174, contention analysis and scheduling are performed in the electrical domain. Switch controller 174 may be implemented as a field programmable gate array (FPGA) or another dedicated hardware processor, such as an application specific integrated circuit (ASIC). In one example, a frame is either granted or rejected. Switch controller 174 adjusts the connections in optical switch 172, an nP by nP optical space switch, or n parallel P×P switches, to facilitate switching of the granted frames. At the beginning of the slots, the scheduling information on which payload slots are granted is also passed to combiners 182, so that the TOR switches receive the grant or rejection information for the requested slot. In one example, switch controller 174 maintains a schedule for optical switch 172. In synchronous control, during a time slot, each input terminal and each output terminal may only be used once. When a TOR switch requests an input terminal and an output terminal at a time slot at RTT+p, where p is the processing time to process a transmission request, switch controller 174 checks whether the output is available at the requested time slot. When the output is available that time slot and output port are scheduled for the requested frame. When the output port is already scheduled for that time slot, the request may be denied. Alternatively, the frame is scheduled for a subsequent time slot.

The payload data is switched by optical switch 172. Optical switch 172 may be an optical space switch. An optical space switch is a photonic packet switch which couples an input to an output for the duration of an optical frame. In one example, optical switch 172 is a solid state photonic switch, for example made from silicon.

The switched payload data is optionally filtered by filters 176, which pass the payload wavelengths but filter out the control wavelengths. Filters 176 may be bandpass or low-pass filters. Filters 176 allow the payload wavelengths to pass through while filtering out the control wavelengths. In some embodiments, this filter is not used, and the label detector 170 is a bandpass filter for the signaling waveband.

Then, synchronization information is added by block 178, which produces a pulse at $\lambda_1$, a wavelength in the control waveband. In one example, a synchronization pulse is generated on regular intervals. For example, a synchronization pulse is added every time slot. If no wrapper scheme is used, the longest packet size may be 1500 bytes. Then, a synchronization message is transmitted every 120 ns plus the inter-packet gap over a 100 Gbps link. For a wrapper size of W=16 packets, considering a maximum packet size of 1500 bytes, the synchronization pulse is sent every 1920 ns plus the defined wrapper gap time for 100 Gbps links. The wrapper and its gap are further discussed in U.S. Patent Application Ser. No. 61/822,147 filed on May 10, 2013, and entitled "System and Method for Wrapping Photonic Packets," which application is hereby incorporated herein by reference. The synchronization pulse is modulated on $\lambda_1$ for the destination TORs at the same time.

Next, when there is no contention, another pulse may be added by block 180. The contention pulse at $\lambda_2$, another wavelength in the control waveband, may be before, after, or simultaneous with the synchronization pulse. In one example, when a contention pulse is produced, it indicates that there is no contention, and the frame for the requested destination may be transmitted by the TOR switch. A lack of a contention pulse indicates output contention, where the frame should not be transmitted by the source TOR switch. Alternatively, a contention pulse indicates a lack of contention, and no pulse indicates contention. In another example, block 180 generates two pulses on two different wavelengths that represent bits in a code, for four codes. One code represents a rejection, one code represents a grant in the requested time slot, one code represents a grant in the time slot immediately after the requested time slot, and one code represents a grant in a time slot two time slots after the requested time slot. Block 178 and block 180 are 1×N splitters. In one example, they are silicon photonics.

Combiners 182 then combine the payload data, synchronization pulses, and contention pulses. In one embodiment, the combiner is an ON/OFF switch controlled by the contention pulse. When the combiner is ON, the waveguide carrying $\lambda_2$ is joined with the waveguide carrying the payload data. The contention controller determines which combiner will be ON. When there is no contention, a contention pulse is produced to signal the grant. This contention pulse facilitates the combination of $\lambda_2$ with the payload and synchronization pulses inside the silicon photonic chip. Also the signals are carried to the destination TOR switch.

Photonic switching fabric 168 outputs switched payload data 186, synchronization pulses 188, and contention pulses 190. These signals are received by TOR switches 162.

Additional details on a system for coordination of optical packets for optical packet switching are provided in U.S. patent application Ser. No. 14/246,633 filed on Apr. 7, 2014, and entitled "System and Method for Photonic Switching," which application is hereby incorporated herein by reference.

Figure 3:
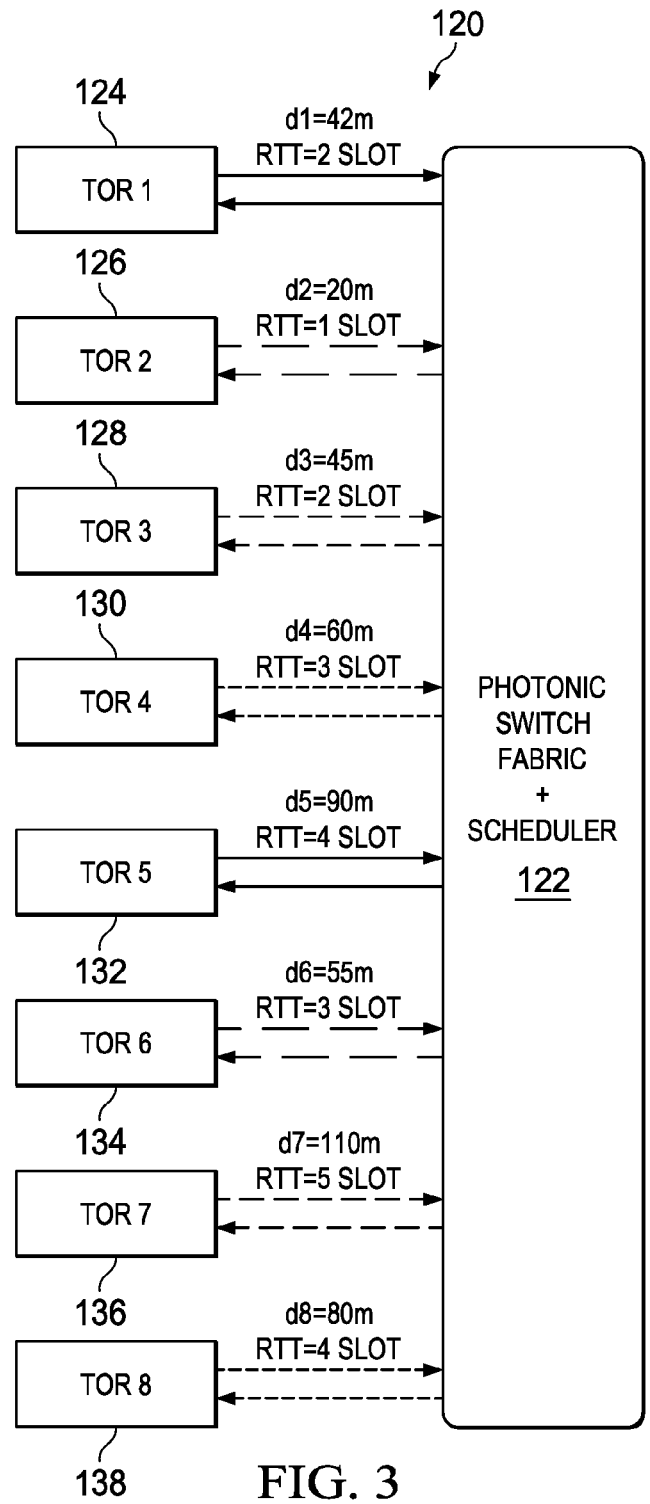
FIG. 3 illustrates an embodiment photonic switching system.

FIG. 3 illustrates system 120 for photonic switching. Photonic switching fabric and scheduler 122 is coupled to TOR switches 124, 126, 128, 130, 132, 134, 136, and 138. Eight TOR switches are pictured, but fewer or more TOR switches may be used. Data frames are transmitted by the TOR switches, to photonic switching fabric and scheduler 122, and transmitted to the target TOR switches. Before a frame is transmitted, the source TOR switch transmits, to the photonic switching fabric, a request to transmit a frame in the future. The scheduler 122 responds with a grant or a denial of the frame in the requested time slot to the requested output port. In one example, photonic switching fabric and scheduler 122 responds with a grant for the frame to be switched in a later time slot.

Photonic switching fabric and scheduler 122 sends a synchronization pulse to the TOR switches at the same time to synchronize the reception of the frames at the input ports of the photonic switch. The slot time is a unit of time equal to the duration of that an input of the photonic switch is connected to the output of the photonic switch for switching a frame, including the set up time. The slot time may be equal to the frame size plus the gap time between frames and the switching time. The slot time may be equal to the wrapper size plus the gap between the wraps. A wrapper accumulates many packets with the same attributes, such as the network, destination, etc. in a large frame, with a new gap time equal to sum of all the inter-packet gaps (IPGs) of the native packets. The system may act as a slotted system, with synchronization pulses received at regular intervals. The TOR switches transmit requests in advance by the RTT plus the processing time, p, of the label at the photonic switching fabric. The RTT is different for different TOR switches, based on the length of fiber connecting that TOR switch to the photonic switching fabric. The slot time is based on the size of wrapper. For example, when the wrapper includes one packet of the maximum size, one slot is 120 ns for 100 G transmission. This time is equal to the travel of light in a fiber with a length of 24 m. From a switch control point of view, the RTT and label processing time is rounded up in units of time slots. TOR switch 124 has a fiber distance of 42 m and a RTT of 2 slots, TOR switch 126 has a fiber distance of 20 m and a RTT of 1 slot, TOR switch 128 has a fiber distance of 45 m and a RTT of 2 slots, TOR switch 130 has a fiber distance of 60 m and a RTT of 3 slots, TOR switch 132 has a fiber distance of 90 m and a RTT of 4 slots, TOR switch 134 has a fiber distance of 55 m and a RTT of 3 slots, TOR switch 136 has a fiber distance of 110 m and a RTT of 5 slots, and TOR switch 138 has a fiber distance of 80 m and a RTT of 4 slots.

The requests are destination TOR switch addresses wavelength encoded. The requests arrive at the photonic switching fabric. Then, the switch controller processes the requests. Non-contending destinations receive a grant message, while contended destinations receive either a reject or a grant in a later time slot message. The photonic switching fabric updates the schedule based on a connectivity map of the switch reflecting the connectivity of the granted TOR switches.

A TOR switch, upon receiving a synchronization signal and a grant message, determines the time to transmit the frame from the actual measured RTT+p, so the frames from multiple TOR switches arrive at the input of the photonic switch synchronously. The payload is buffered at the TOR switch in the electronic domain until it receives a grant. The precise RTT may be measured using a linear cavity ring or an optical time domain reflectometer (OTDR). The RTT may be measured during provisioning as a one-time measurement. Alternatively, the RTT is determined during operation by transmitting a special message on a dedicated control waveband for management or provisioning.

FIG. 4 illustrates request table 140 for TOR switches requesting photonic switch outputs. Synchronization occurs at the photonic switch input. Each column represents requests from eight inputs, and the number indicates the requested output port. For example, in slot 1, S1, the photonic switching fabric receives a request from input 1 to be connected to output 3, from input 2 to be connected to output 6, from input 3 to be connected to output 2, from input 4 to be connected to output 8, from input 5 to be connected to output 1, from input 6 to be connected to output 1, from input 7 to be connected to output 4, and from input 8 to be connected to output 3. Then, in time slot 2, S2, the switch receives the next set of connection requests. The requests are received by the photonic switching fabric RTT+p in advance of when the photonic switch will receive that frame. A check mark indicates no contention, while an x indicates contention.

Figure 5:
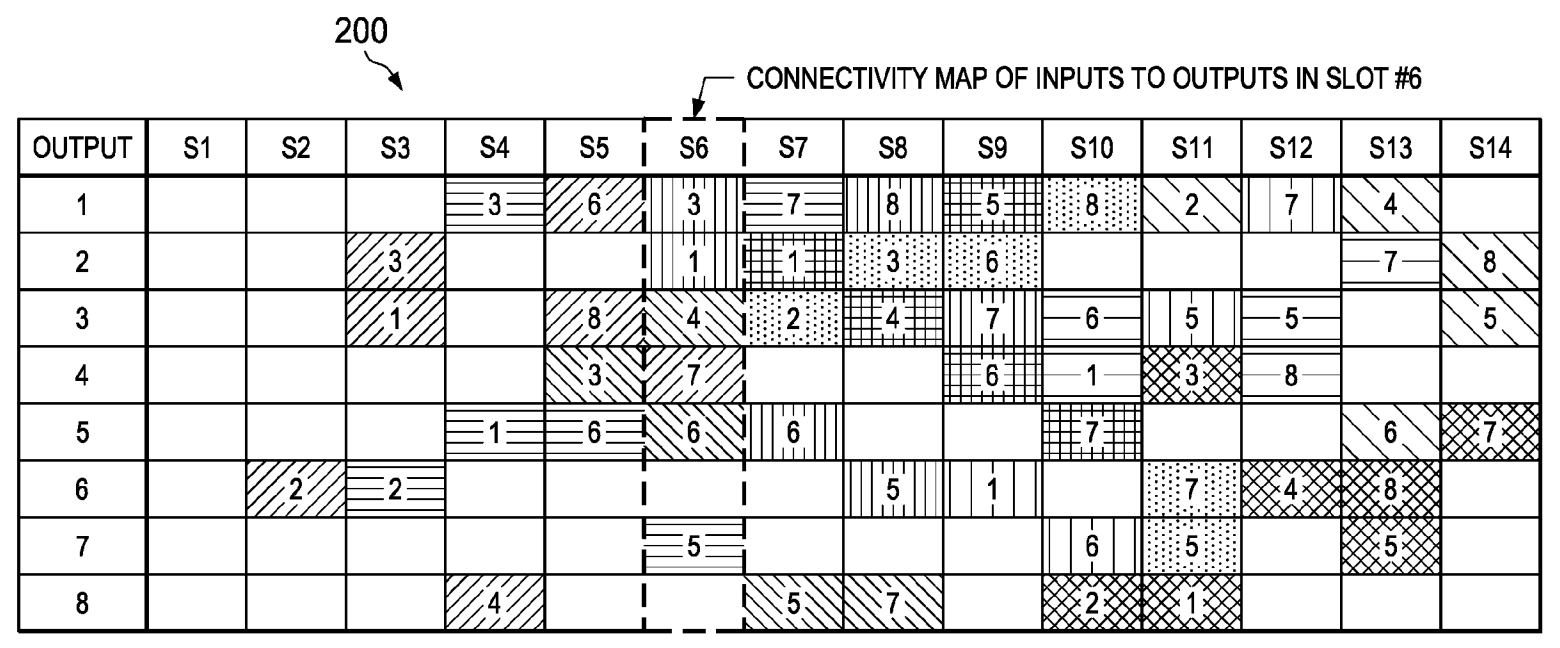

FIG. 5 illustrates connectivity map 200 which shows the connectivity map of inputs to outputs in a photonic switch by time slot. The scheduling table at the photonic switching fabric corresponds to the actual traffic sent by the TOR switches after receiving a grant or reject message from the photonic switching fabric. The rows indicate the output ports, and the number in the cell indicates the input port that output port connects to. The time slots are scheduled based on the RTT+p in advance. For example, in time slot 6, input 3 is connected to output 1, input 1 is connected to output 2, input 4 is connected to output 3, input 7 is connected to output 4, input 6 is connected to output 5, and input 5 is connected to output 7.

In one example, input 2 requests to be connected to output 1 in time slot 4, with a rounded RTT+p of 1. The rounded RTT+p is rounded up in units of time slots. Thus, input 2 is requesting this connection for time slot 6. However, output 1 is already scheduled to be connected to input 3 at time slot 6. Input 3 had requested to be connected to output 1 in time slot 2 with a RTT+p of 2. Thus, input 3 has a contention for this request.

If a time slot is already taken when the scheduler receives a request, the TOR switch may receive a rejection, and may try again later for that same connection. Alternatively, the connection may be scheduled for a later time slot. In this example, the photonic switching fabric may transmit a message indicating the scheduled time slot for the frame.

Figure 6:
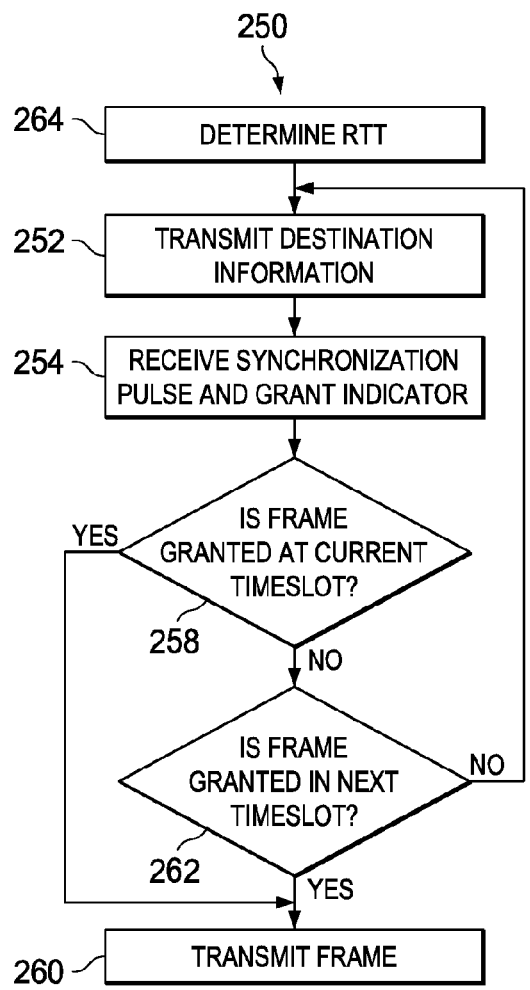
FIG. 6 illustrates a flowchart of an embodiment method of coordinating photonic frames.

FIG. 6 illustrates flowchart 250 for a method of coordinating optical frames or wrappers performed by a TOR switch. A frame is defined as an individual packet or one or more wrapped packet. Initially, in step 264, the TOR switch determines the RTT for a photonic frame to the photonic switching fabric and back. This may be performed at commissioning or during operation. In one example, a linear cavity ring is used. Alternatively, an OTDR is used.

In step 252, the TOR switch transmits a request to transmit a frame. The destination address is modulated in a waveband, for example, a 1550 nm waveband. In one example, the presence or absence of light at one of twelve wavelengths in the waveband indicate bits in the destination address. In an example, twelve bit labels identify the destination port address of the switch. The twelve bits are encoded on twelve wavelengths. For example, twelve wavelengths between 1500 nm and 1600 nm with a spacing of 8 nm are used. The wavelengths have two power levels. Low power may represent a 0 and high power a 1, or vice versa. Twelve wavelengths address 4096 ports. In other examples, four, eight, sixteen, or another number of wavelengths are used. The ports may be connected to TOR group address domains or subnets. More details on wavelength encoding are discussed in U.S. patent application Ser. No. 13/902,085 filed on May 24, 2013, and entitled "System and Method for Multi-Wavelength Encoding," which application is hereby incorporated herein by reference.

In response to the address transmitted in step 252, the TOR receives a synchronization pulse and grant indicator from the photonic switching fabric in step 254. The grant indicates whether or not permission has been granted for the TOR switch to transmit the frame in the requested time slot. In one example, a synchronization pulse followed by a grant pulse indicates that the frame has been granted permission for transmission, and a synchronization pulse not followed by a grant pulse indicates that the frame has not been granted permission for transmission. In another example, two wavelengths representing two bits are transmitted, indicating a rejection, a grant for the requested time slot, or a grant in a later time slot.

Next, in step 258, the TOR switch determines whether permission to transmit the frame in the current time slot has been granted. In one example, a synchronization pulse followed by another pulse indicates that permission has been granted, while a synchronization pulse that is not followed by another pulse indicates that permission has not been granted. The synchronization pulse and the grant pulse may be at different wavelengths. Alternatively, the synchronization pulse and the grant pulse are at the same wavelength. The synchronization pulse and grant pulse may be in the control waveband. In one example, two wavelengths are used to encode two bits. For example 00 indicates a rejection, 11 indicates a grant, 01 indicates a grant in the next time slot, and 10 indicates a grant for two slots in advance. Other embodiments may use more wavelengths.

When permission is granted, the TOR switch transmits the frame in step 260. In this step, the TOR switch waits for time delta between round (RTT+p) in units of time slots and the actual RTT+p before sending the frame. The frame is modulated on a payload wavelength using an integrated WDM transceiver. The TOR switch transmits the frame, so that it will arrive at the photonic switching fabric input at the beginning of the assigned time slot. This is performed using the RTT+p calculated in step 264, to facilitate synchronous arrival of frames at the input ports of the photonic switching fabric.

When permission to transmit the frame is not granted, the TOR switch proceeds to step 262. In optional step 262, the TOR switch determines whether the frame has been granted in the next time slot. In one example, one wavelength indicates whether the frame is granted in the requested time slot, and another wavelength indicates whether the frame is granted in the next time slot. If the frame is granted in a subsequent time slot, the frame may be delayed by one or more time slot in step 262, and then transmitted in step 260. If the frame is not granted, the TOR switch returns to step 252 to again seek permission to transmit the frame. A counter may be incremented when the frame is again requested. When the counter reaches a threshold, the frame may be dropped. Alternatively, the frame is sent to another switch, for example an electronic frame switch, that handles overloads, when the counter reaches the threshold. In an example, the photonic switching fabric uses unused slots to send management data, performance monitoring of data, and software updates to the TOR switches.

Figure 7:
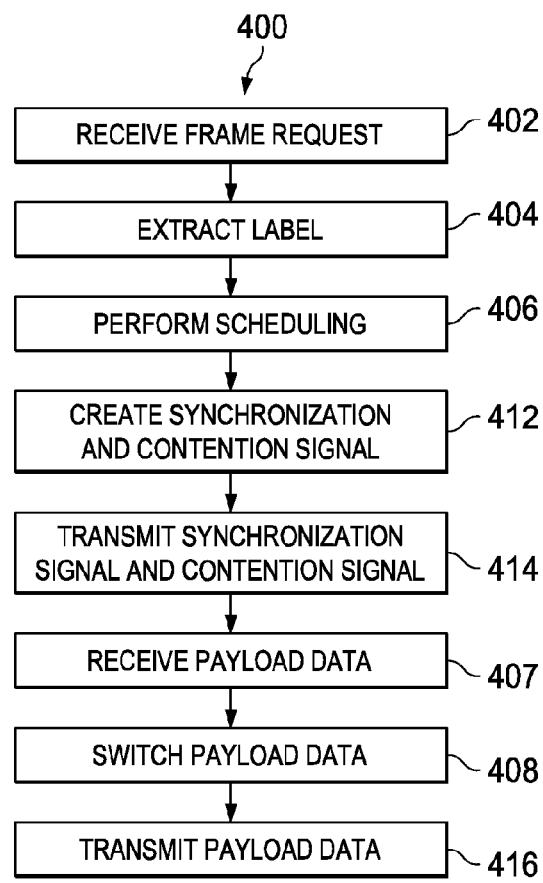
FIG. 7 illustrates a flowchart of an embodiment method of scheduling photonic frames.

FIG. 7 illustrates flowchart 400 for a method of scheduling frames performed by a photonic packet switching fabric. Initially, in step 402, a frame request is received by the photonic switching fabric from a TOR switch. The destination information may be wavelength encoded where the presence or absence of light in a wavelength indicates a bit. The frame request is received RTT+p in advance of the time slot being requested.

Then, in step 404, the destination address for a future frame is extracted from the frame request. For example, the destination address information is filtered by a passband filter to separate out the signaling wavelengths. Whether there is power at each wavelength is determined. In one example, the presence of optical power at a wavelength indicates a one bit and the absence of optical power indicates a zero bit. The bit pattern may be used to determine the destination address of a future frame.

Next, in step 406, scheduling is performed, so that, at a given time, each input port and output port is only used at most once. Some frames are approved for transmission, while other frames are rejected. The photonic switching fabric determines the time slot on which the requested frame will arrive. The time slot is the rounded RTT+p in units of time slots. The photonic switch determines whether the requested output port is already scheduled for the requested time slot. If there is no contention, the frame is scheduled for the requested time slot. If there is contention, the frame may be rejected. In one example, the photonic switch determines whether the output is available in the next time slot. If it is available, the frame is scheduled for the next time slot. If the next time slot is not available, the frame is rejected or scheduled for a later time slot.

In step 412, synchronization and contention signals are created. A synchronization pulse may synchronize the TOR switches using a dedicated wavelength. The synchronization pulse may be followed by a contention pulse for a TOR switch which is granted permission to transmit a frame, and followed by nothing if the permission is not granted. The contention pulse and the synchronization pulse may be different wavelengths within the control waveband. In one example, an addition wavelength is used to indicate whether the frame is approved for the next time slot.

The synchronization signal, contention signal, and switched payload frames are transmitted to a TOR in step 414. The switched payload signal is modulated on the payload waveband while the synchronization and control signals are modulated on the control waveband. The synchronization signal and contention signal may be transmitted on the same waveband as the labels.

The payload data is received in step 407. The payload frames are synchronously received at the input of the photonic switch.

In step 408, the payload data is switched. This is done, for example, by an optical space switch, which maintains a connection for the duration of the slot. The connections in the optical space switch may be set based on the scheduled frames for the current time slot. The optical space switch may be a solid state photonic switch.

Finally, in step 416, the switched payload data is transmitted to the destination TOR switches. While steps 407, 408, and 416 are being performed, steps 402, 406, 412, and 414 are being performed for future time slots.

Figure 8:
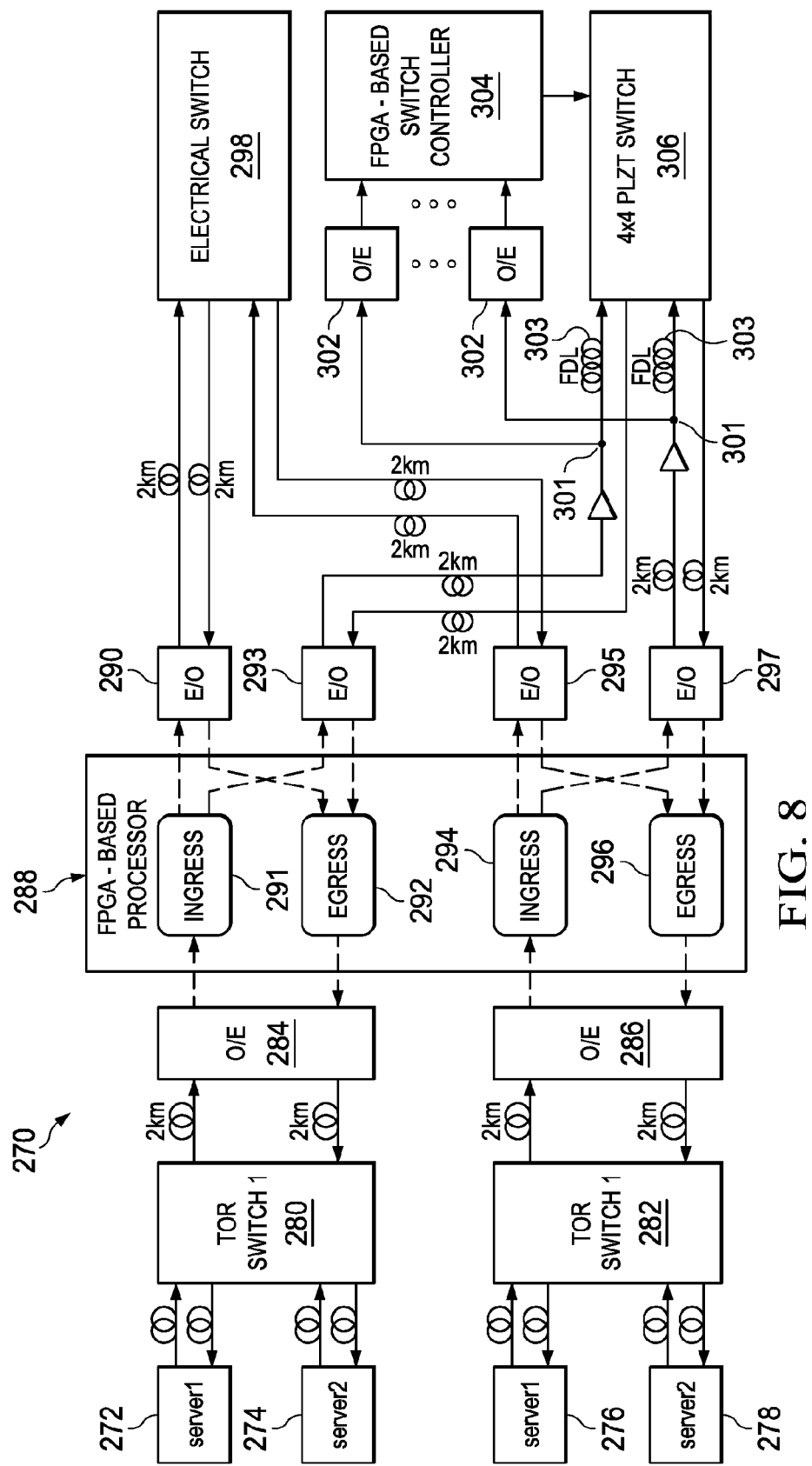
FIG. 8 illustrates an embodiment system for photonic packet switching.

FIG. 8 illustrates system 270, an embodiment system with electrical switch 298 and photonic switch 306, where short packets are switched by electrical switch 298 and long packets are switched by photonic switch 306. Additional details on a packet switching system where short packets are switched by an electrical switch and fast packets are switched by a photonic switch are discussed in U.S. patent application Ser. No. 13/902,008 filed on May 24, 2013, and entitled "System and Method for Steering Packet Streams," which application is hereby incorporated herein by reference.

Servers 272 and 274 are coupled to TOR switch 280, while servers 276 and 278 are coupled to TOR switch 282. The optical signals for TOR switch 280 and TOR switch 282 are converted to the electrical domain by optical-to-electrical converters 284 and 286, respectively.

Processor 288, a field-programmable gate array (FPGA), processes the packets. In one example, processor 288 is integrated with TOR switches 280 and 282. Incoming packets are processed by ingress 291 and ingress 294, while outgoing packets are processed by egress 292 and egress 296. The links between TOR switches 280 and 282 and processor 288 are 10 Gigabit Ethernet. In ingress 291 and ingress 294, the long packets are separated from the short packets. Long packets are prepared for photonic switching by resolving packet contention. After the contention is resolved, the packets are compressed, bitwise scrambled, and a photonic destination label is added. A label is followed by a scrambled media access control (MAC) frame. By compressing the long packets, there is sufficient inter-packet gap for the insertion of the in-band photonic label, and there is more time for the photonic switch connection set-up and for receiver synchronization at the destination aggregation switch. The packet compression is achieved by raising the clock rate on the output physical layer. The long packets are 10% overclocked at 11.35 Gb/s. The label is a short pattern at 11.35 Gb/s. Additional details on the packet compression are provided by U.S. patent application Ser. No. 13/901,944 filed on May 24, 2013, and entitled "System and Method for Accelerating and Decelerating Packets," which application is hereby incorporated herein by reference.

In egress 292 and egress 296, the reverse operation is performed. The photonic long packets and the electronic short packets are received. The packets are re-ordered and forwarded as internet protocol (IP)/Ethernet packets towards the destination TOR switches.

The processed packets are then converted from the electrical domain to the optical domain by electrical-to-optical converters 290, 293, 295, and 297. Short packets are routed to electrical-to-optical converters 290 and 295 and proceed to be switched by electrical switch 298.

Long packets are routed to photonic switch 306, a 4×4 Lead-Lanthanum-Zirconate-Titanate (PLZT) photonic switch. The switching time of photonic switch 306 is about 10-20 ns. Fiber splitters 301 direct 10% of the power to optical-to-electrical converters 302. The electrical signals are used to control photonic switch 306 by switch controller 304, an FPGA based switch controller. Fiber delay lines 303 delay the signal long enough for the switch controller to read the photonic label and set the switch connection before the packet arrives.

Figure 9A:
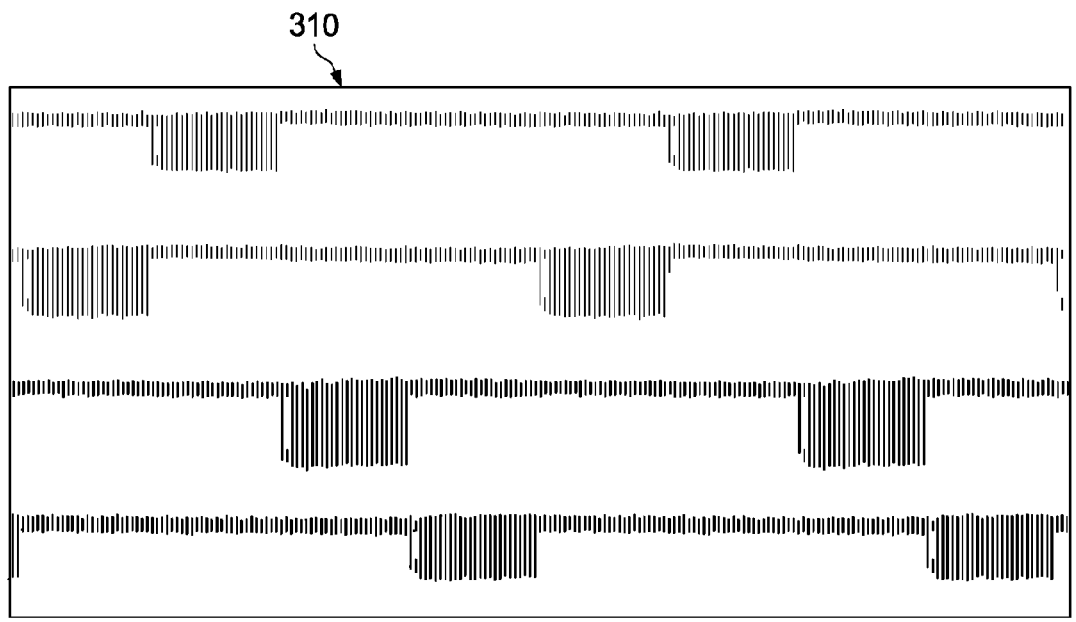
FIGS. 9A-D illustrate waveforms and an eye diagram for a photonic packet switching system.
Figure 9B:
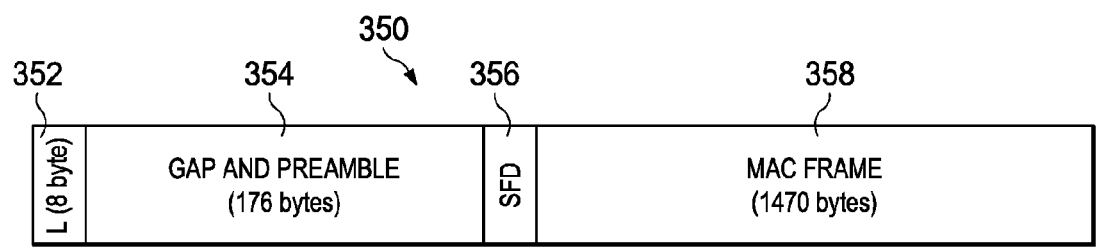
Figure 9C:
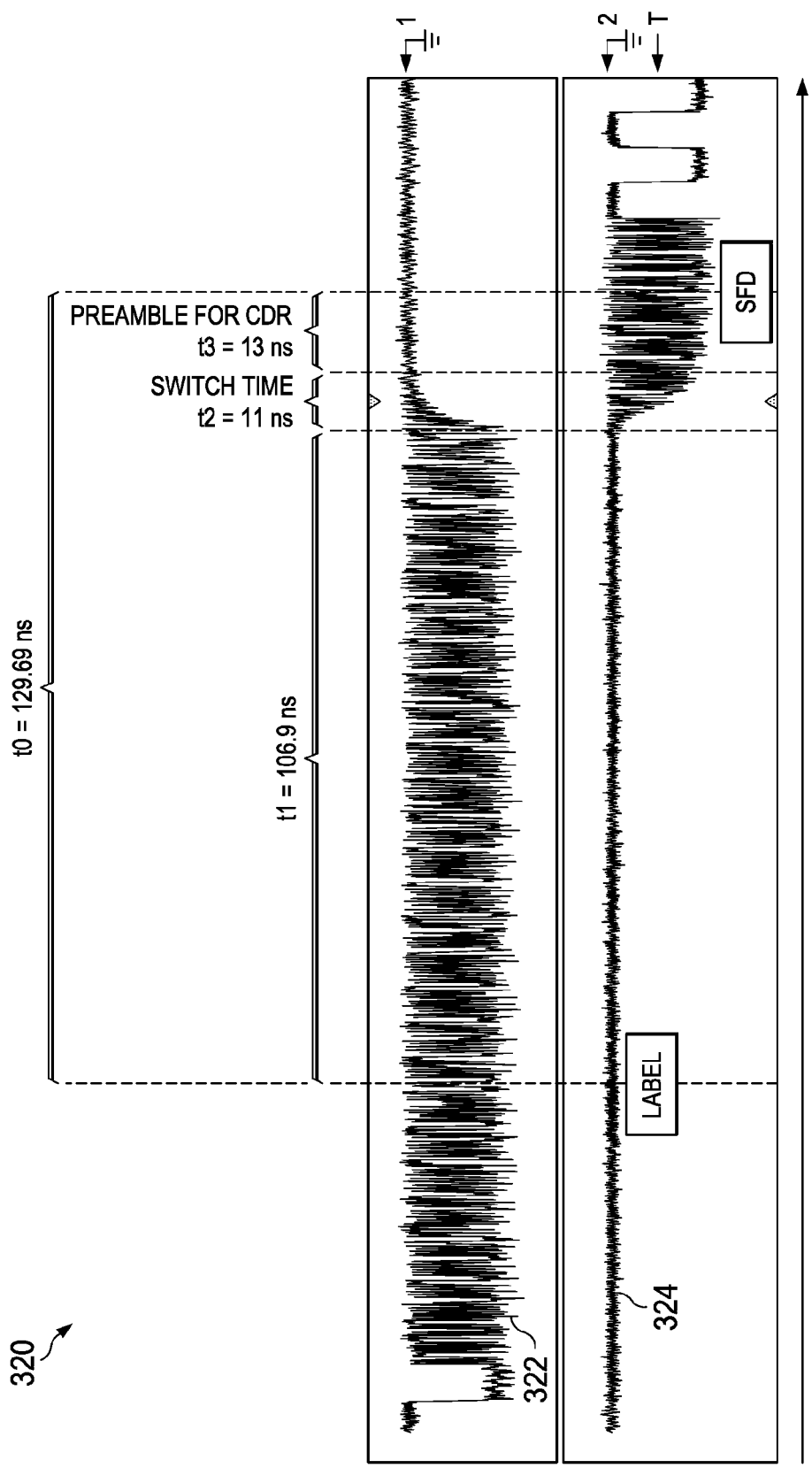

FIGS. 9A-C illustrate results from system 270 in FIG. 8. Server 272 sends Ethernet frames with four different destination MAC addresses, each destined to a different photonic output port of photonic switch 306. FIG. 9A illustrates graph 310 with the frame waveform on the four output ports of photonic switch 306. The photo-receiver voltage polarity is inverted, with horizontal lines when there is no light and the waveforms when there are switched frames.

FIG. 9B illustrates frame structure 350. Frame structure 350 contains label 352, which is 8 bytes, gap and preamble 354, which is 176 bytes, start frame delimiter (SFD) 356, and media access control (MAC) frame 358, which is 1470 bytes.

FIG. 9C illustrates graph 320 with a detailed output frame waveform of output ports 1 and 2 of photonic switch 306. Curve 322 shows the completion of a photonic frame transmission, and curve 324 starts sending a preamble and photonic label. Time t0 represents the total time for the label, gap, preamble, and SFD. Time t1 represents the earliest time that the process of a label can be started before frame transmission is completed. Time t1 is 106.9 ns, the switch response time t2 is 12 ns, residual preamble for receiver synchronization is 15 ns, the preamble for clock and data recovery (CDR) t3 is 13 ns, and SFD time is 12 ns.

Figure 9D:
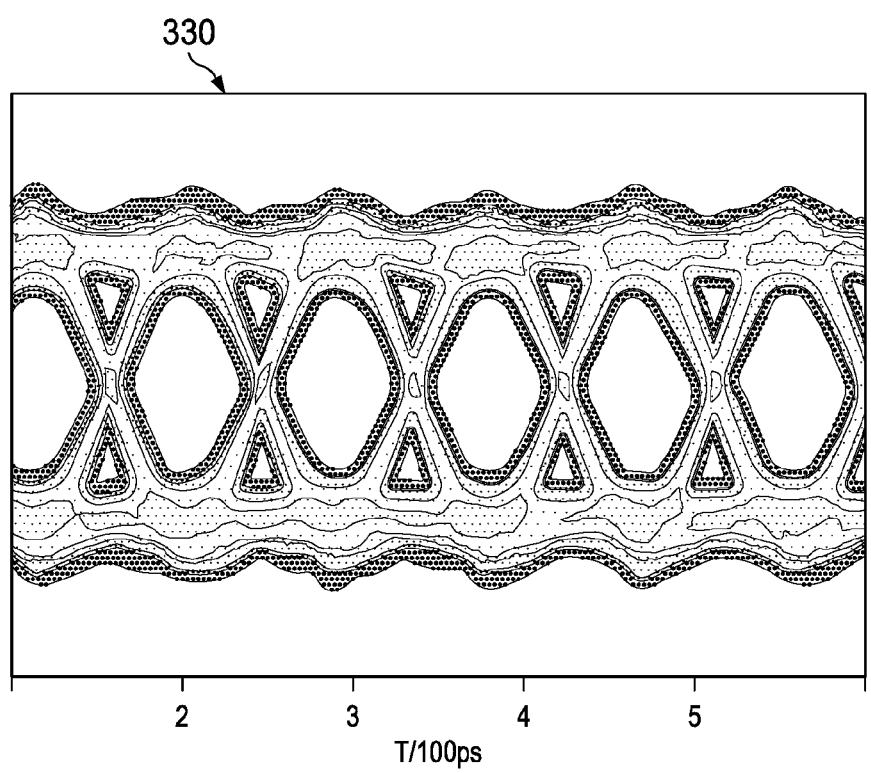

FIG. 9D illustrates graph 330 with an eye diagram of the switched signal. Because the total processing time is 130 ns, the latency for control processing is approximately 130 ns minus the switch response time minus the residual preamble time, or 103 ns. This delay can be compensated for by a 21 m fiber delay line.

Figure 10:
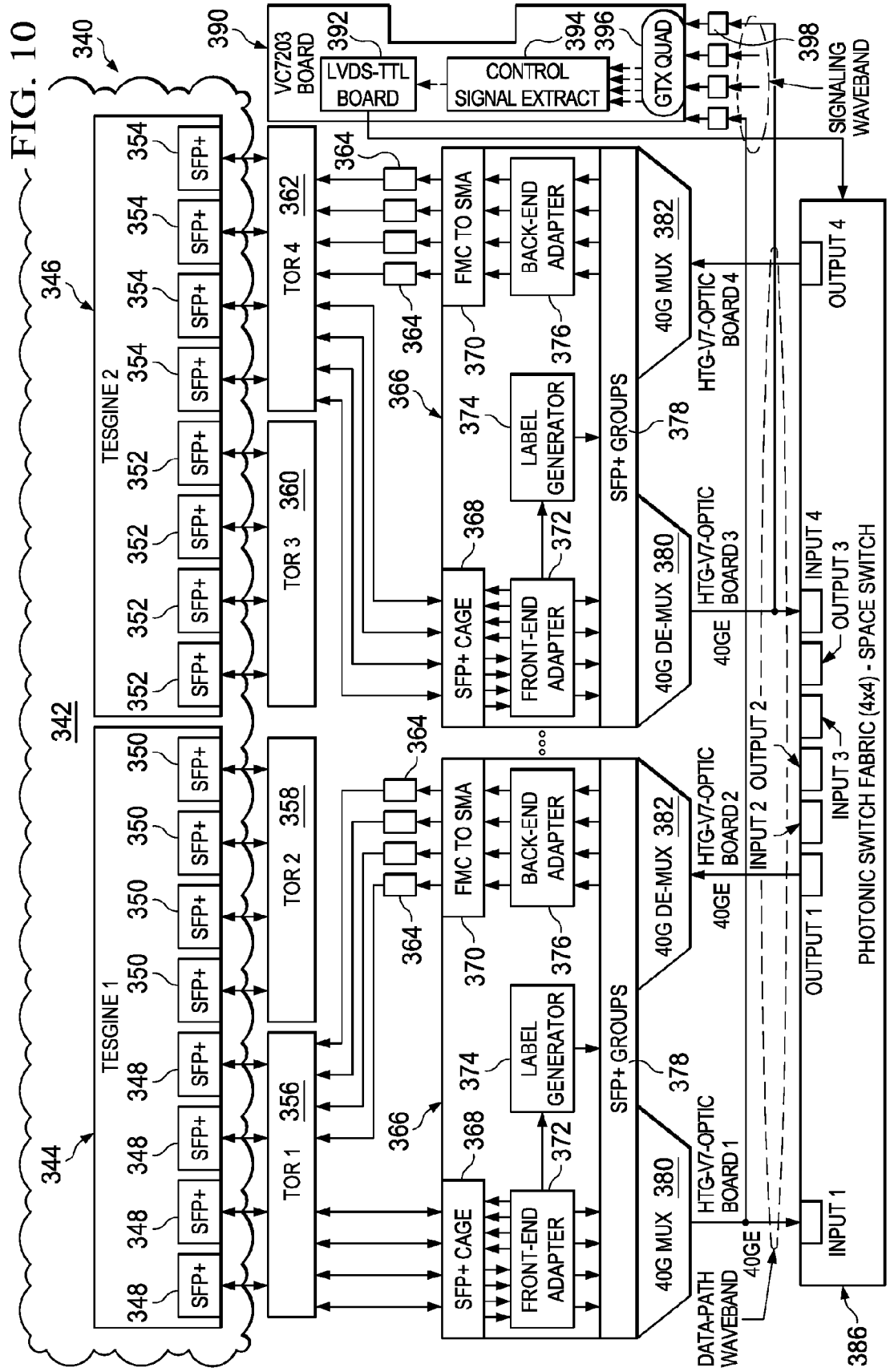
FIG. 10 illustrates another embodiment system for photonic packet switching.

FIG. 10 illustrates system 340, an embodiment photonic switching system that uses optical space switching. System 340 may be an implementation of a photonic switching fabric 160 in FIG. 2. With the use of a wrapper scheme, all packets are wrapped into a large photonic frame, and there is no need for electrical packet switch to handle small packets. Separate wavebands are used for the control signal path and the payload data path. Photonic routing labels are used on the forward path, the path from the source TOR switch to the photonic switching core. Signaling on the return path, the path from the photonic core to the destination TOR switch, is used for contention control and synchronization.

Server network 342 is simulated by simulator 344 and simulator 346. Simulators 344 and 346 contain small form factor pluggable transceivers (SFPs) 348, 350, 352, and 354, which are connected to TOR switches 356, 358, 360, and 362. The signals are sent to FPGA 366.

In FPGA 366, signals are received by SFP 368. These signals are processed by front-end adaptor 372. Labels are generated by label generator 374. The signals and groups are output by SFP 378 to photonic switching fabric 386 and FPGA 390.

The optical signal of the labels is converted to an electrical signal by optical-to-electrical converters 398, and is received by FPGA 390. They are processed by processor 396. Then, the control signal is extracted by control signal extractor 394. The control signals are then converted by low-voltage differential signal (LVDS) to transistor-transistor logic (TTL) board 392.

The data wavepath signals are multiplexed by multiplexer 380, a 40 G multiplexer, and output to photonic switching fabric 386. The control signals from FPGA 390 are also input to photonic switching fabric 386. Photonic switching fabric 386 is a 4×4 optical space switch. The signals are switched, and output to FPGA 366.

The signals are received by demultiplexer 382 and SFP 378. They are processed by back-end adaptor 376. The signals are converted by FPGA mezzanine card (FMC) to subminiature version A (SMA) converter 370. The signals are converted to optical signals by electrical-to-optical converters 364, and proceed to TOR switches 356, 358, 360, and 362.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of photonic frame scheduling, the method comprising:
   receiving, by a photonic switching fabric from a first top of rack (TOR) switch, a first frame request requesting a first time slot for switching a first optical frame to a first output port of a photonic switch of the photonic switching fabric;
   determining whether the first output port of the photonic switch is available during the first time slot;
   generating a first contention signal comprising a grant or a rejection based on whether the first output port of the photonic switch is available during the first time slot;
   assigning the first time slot to the first TOR switch for the first output port of the photonic switch when the first contention signal comprises the grant;
   transmitting, by the photonic switching fabric to the first TOR switch, the first contention signal; and
   receiving, by the photonic switching fabric from the first TOR switch, the first optical frame during the first time slot, when the first contention signal comprises the grant.

2. The method of claim 1, further comprising, when the first contention signal comprises the rejection:
   determining whether the first output port of the photonic switch is available during a second time slot, wherein the second time slot is after the first time slot;
   assigning the second time slot to the first TOR switch for the first output of the photonic switch; and
   receiving, by the photonic switching fabric from the first TOR switch, the first optical frame during the second time slot.

3. The method of claim 1, wherein receiving the first optical frame occurs a round trip time plus a processing time after receiving the first frame request.

4. The method of claim 1, further comprising:
   receiving, by the photonic switching fabric from a second TOR switch, a second frame request requesting the first time slot for switching a second optical frame to the first output port of the photonic switch; and
   detecting a contention between the first frame request and the second frame request.

5. The method of claim 1, further comprising connecting a first input port of the photonic switch to the first output port of the photonic switch for a duration of the first time slot, wherein receiving the first optical frame comprises receiving the first optical frame on the first input port of the photonic switch.

6. The method of claim 1, further comprising transmitting, by the photonic switching fabric to the first TOR switch, a synchronization pulse.

7. The method of claim 1, wherein the first frame request is in a control waveband and the first optical frame is in a payload waveband.

8. The method of claim 1, further comprising:
   switching the first optical frame in accordance with the first frame request to produce a switched optical frame; and
   transmitting, by the photonic switching fabric to a second TOR switch, the switched optical frame.

9. The method of claim 1, wherein the first contention signal comprises a first pulse at a first wavelength representing a first bit and a second pulse at a second wavelength representing a second bit.

10. A photonic switching fabric comprising:
    a first label detector configured to receive a first transmission request from a first top of rack (TOR) switch requesting a first time slot for switching a first optical frame to a first output port of a photonic switch;
    a switch controller configured to determine whether the first output port of the photonic switch is available during the first time slot, assign the first time slot to the first frame when the first time slot is available, and transmit a first contention signal rejecting or granting the first frame to be transmitted to the first TOR switch during the first time slot; and the photonic switch configured to receive the first frame from the first TOR switch during the first time slot when the first contention signal grants the first transmission request.

11. The photonic switching fabric of claim 10, further comprising a second label detector configured to receive a second transmission request from a second TOR switch requesting the first time slot for switching a second optical frame to the first output port of the photonic switch, wherein the switch controller is configured to detect a contention in accordance with the first and second transmission requests.

12. The photonic switching fabric of claim 10, wherein the first contention signal indicates whether the first frame is rejected, assigned to the first time slot, or assigned to a second time slot, wherein the second time slot is after the first time slot.

13. The photonic switching fabric of claim 12, wherein the first contention signal comprises a first pulse at a first wavelength representing a first bit and a second pulse at a second wavelength representing a second bit.

14. The photonic switching fabric of claim 10, wherein the switch controller is configured to connect a first input port of the photonic switch to the first output port of the photonic switch during the first time slot, wherein the first input port of the photonic switch is configured to receive the first frame.

15. The photonic switching fabric of claim 10, wherein the photonic switch is an optical space switch.

16. The photonic switching fabric of claim 10, wherein the transmission request is in a control waveband, and wherein the first optical frame is in a payload waveband.

17. The photonic switching fabric of claim 10, wherein the frame comprises a packet or a wrapped packet.

18. A photonic switching fabric comprising:
a processor; and
a non-transitory computer readable storage medium storing programming for execution by the processor, the programming including instructions to:

receive a first frame request from a first top of rack (TOR) switch, the first frame request requesting a first time slot for switching a first optical frame to a first output port of a photonic switch in the photonic switching fabric;

determine whether the first output port of the photonic switch is available during the first time slot;

generate a first contention signal comprising a grant or a rejection based on whether the first output port of the photonic switch is available during the first time slot;

assign the first time slot to the first TOR switch for the first output port of the photonic switch when the first contention signal comprises the grant;

transmit the contention signal to the first TOR switch; and receive the first optical frame from the first TOR switch during the first time slot when the first contention signal comprises the grant.

19. The photonic switching fabric of claim 18, wherein the programming further includes instructions to:

receive a second transmission request from a second TOR switch, the second transmission request requesting the first time slot for switching a second optical frame to the first output port of the photonic switch; and detect a contention in accordance with the first and second transmission requests.

20. The photonic switching fabric of claim 18, wherein the first contention signal indicates whether the first frame is rejected, assigned to the first time slot, or assigned to a second time slot, and wherein the second time slot is after the first time slot.

21. The photonic switching fabric of claim 20, wherein the first contention signal comprises a first pulse at a first wavelength representing a first bit and a second pulse at a second wavelength representing a second bit.

22. The photonic switching fabric of claim 18, wherein the photonic switch is an optical space switch.

* * * * *